(12) United States Patent
Lai et al.

(10) Patent No.: US 6,191,543 B1
(45) Date of Patent: Feb. 20, 2001

(54) INTEGRATED CIRCUIT FOR MULTIPLE-AXIS POSITION CONTROL

(75) Inventors: Chen-Kuo Lai, Hsinchu; Wen-Chuan Chen, Tao Yuan; Ying-Min Chen; Chang-Yu Ho, both of Hsinchu, all of (TW)

(73) Assignee: Industrial Technology Research Institute, Hsinchu (TW)

( * ) Notice: Under 35 U.S.C. 154(b), the term of this patent shall be extended for 0 days.

(21) Appl. No.: 09/301,213

(22) Filed: Apr. 28, 1999

(51) Int. Cl.[7] .................................................. H02P 1/54
(52) U.S. Cl. .............................. 318/34; 318/39; 318/560; 341/155
(58) Field of Search ..................... 318/34–115, 560–696; 341/155, 122; 364/566, 174, 559

(56) References Cited

U.S. PATENT DOCUMENTS

| | | | |
|---|---|---|---|
| 4,644,232 | * | 2/1987 | Nojiri et al. ............................. 318/66 |
| 4,712,052 | * | 12/1987 | Omae et al. .......................... 318/625 |
| 4,774,441 | * | 9/1988 | Toyomasu et al. .................. 318/102 |
| 4,827,195 | * | 5/1989 | Newell et al. ........................... 318/49 |
| 4,878,002 | * | 10/1989 | Heatzig et al. ..................... 318/568.2 |
| 5,121,040 | * | 6/1992 | Takizawa et al. ..................... 318/574 |
| 5,124,938 | * | 6/1992 | Algrain ................................. 364/566 |
| 5,136,222 | * | 8/1992 | Yamamoto et al. ............ 318/568.12 |
| 5,212,430 | * | 5/1993 | Jartyn ...................................... 318/34 |
| 5,237,250 | * | 8/1993 | Zeile et al. ............................ 318/562 |
| 5,241,250 | * | 8/1993 | Nagasawa et al. ................... 318/591 |
| 5,248,922 | * | 9/1993 | Meshkat ................................ 318/560 |
| 5,581,254 | * | 12/1996 | Rundel ................................. 341/155 |
| 5,742,143 | * | 4/1998 | Katagiri ................................ 318/625 |

* cited by examiner

*Primary Examiner*—Paul Ip (57) ABSTRACT

The present invention is an integral-type IC for multiple-axis position control to provide highly integrated and modular design for the positioning control of automatic system. The inventive IC comprises a plurality of digital differential analyzers (DDA) with output pulse circuit which convert the position command to pulse form, a plurality of servo motor position closed loop control positioning circuit, and a plurality of counters that works with motor encoder to precisely control the rotation speed and motion position of the motor. Thus the invention the position control function in a single IC.

20 Claims, 7 Drawing Sheets

INTEGRATED CIRCUIT FOR MULTIPLE-AXIS POSITION CONTROL

FIELD OF THE INVENTION

The present invention relates to an integral-type IC for multiple-axis position control to provide highly integrated and modular design for automatic systems.

BACKGROUND OF THE INVENTION

The application-specific integrated circuit (ASIC) for automatic control system has become popular due to the rapid development of semiconductor technology. For example, micro-controller, multiplexer and embedded microprocessor have found various applications.

Traditional position control of automatic system relies on many different control circuits. As to the control task for a plurality of encoders and control of the handwheels, the different control targets are hard to link, thus increasing cost but also reducing reliability. Moreover, the maintenance of such control circuit is troublesome.

The object of the present invention is to provide an IC to control different sets of servo motors and multiple sets of input/output, thereby minimizing cost and simplifying repair.

Another object of the present invention to provide an IC to control different set of motors, encoders and hand wheels, thereby enchancing the system reliability.

To achieve above and other objects, the IC of the present invention comprises a plurality of digital differential analyzers (DDA) with pulse output circuit which convert the position command to pulse form, a plurality of closed loop positioning control circuits for servo motor, and a plurality of counters with motor encoder to precisely control the rotation speed and position of the motor and integrate the positioning control function in a single IC. In other words, by using the ASIC of the invention, the positioning control task can be integrated into a module.

The various objects and advantages of the present invention will be more readily understood from the following detailed description when read in conjunction with the appended drawings, in which:

DETAILED DESCRIPTION OF THE PREFERRED EMBODIMENTS

The present invention is intended to provide an IC to control different sets of servo motors and multiple set of input/output, thereby minimizing cost and simplifying repair. Moreover, the present invention provides an IC to control different sets of motors, encoders and hand wheels, thereby enhancing the system reliability.

Figure 1:
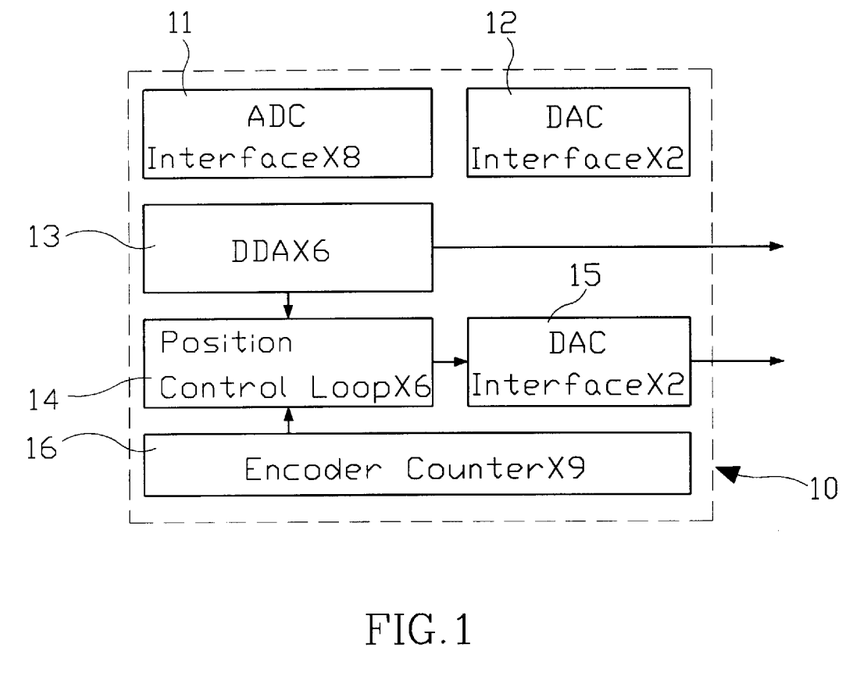
FIG. 1 is the block diagram of the invention

FIG. 1 shows the block diagram of major components of the present invention. As shown in this figure, a multiple-axis positioning control IC 10 is provided to precisely control position and the speed of motor. Moreover, it should be noted that the IC 10 shown in FIG. 1 can be used with other components to achieve modular control, as shown in FIG. 7.

Figure 7:
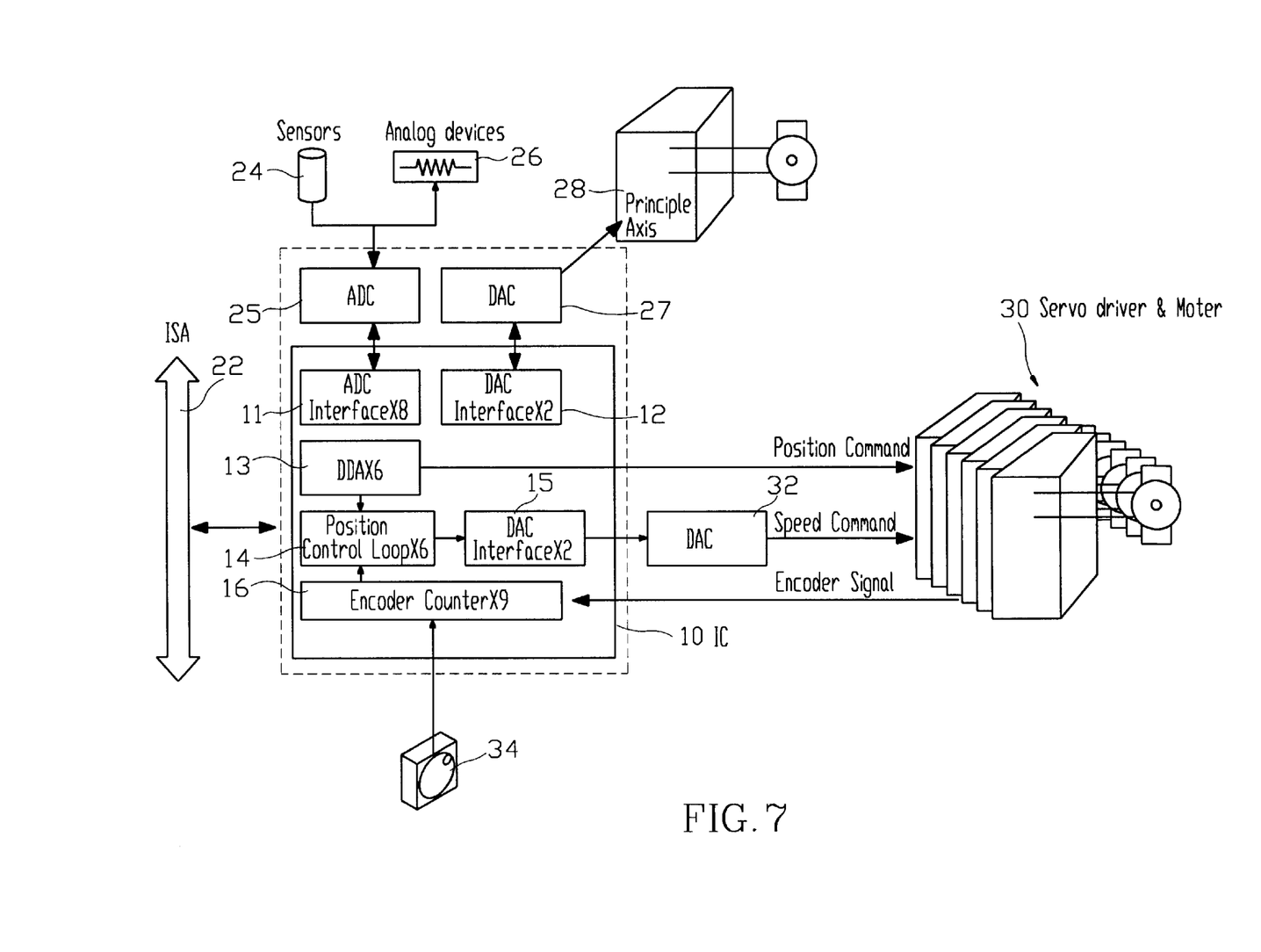
FIG. 7 shows the connection between the preferred embodiment and an external unit.

With reference now to FIG. 1, the IC 10 comprises 8 ADC interfaces 11 used to connect and control an A/D converter 25, and to convert the analog signals from sensors 24 and other analog input devices 26 (shown in FIG. 7) to digital signal, and then sends the digital signal to ISA bus 22 (as shown in FIG. 7) for use by the computer system. Moreover, the IC 10 also comprises 8 DAC interfaces divided into two blocks 12 and 15 wherein the DAC interfaces 15 send the output of the positioning control loop (PCL) 14 to a D/A converter block 32 for generating analog signals required by the control servo driver. The other two DAC interfaces 12 send the output command received from ISA bus 22 to D/A converter 27 which converts the digital signal to analog signal to control external devices such as principle axis device. Moreover, the IC 10 also comprises digital differential analyzer (DDA) 13 to receive the positioning command from ISA bus 22 and convert the command to pulse type signal to PCL 14.

The PCL 14 computes the difference between feedback pulse of encoder counter 16 and the command pulse of the DDA 13 and sends the result to DAC interface 15 after amplification. The encoder counter 16 receives the encoder signal from encoder (not shown in FIG. 7) of the servo motor for recording the rotation position of motor, then sends the counted result to ISA bus 22 and PCL 14 for the further processing.

Figure 2:
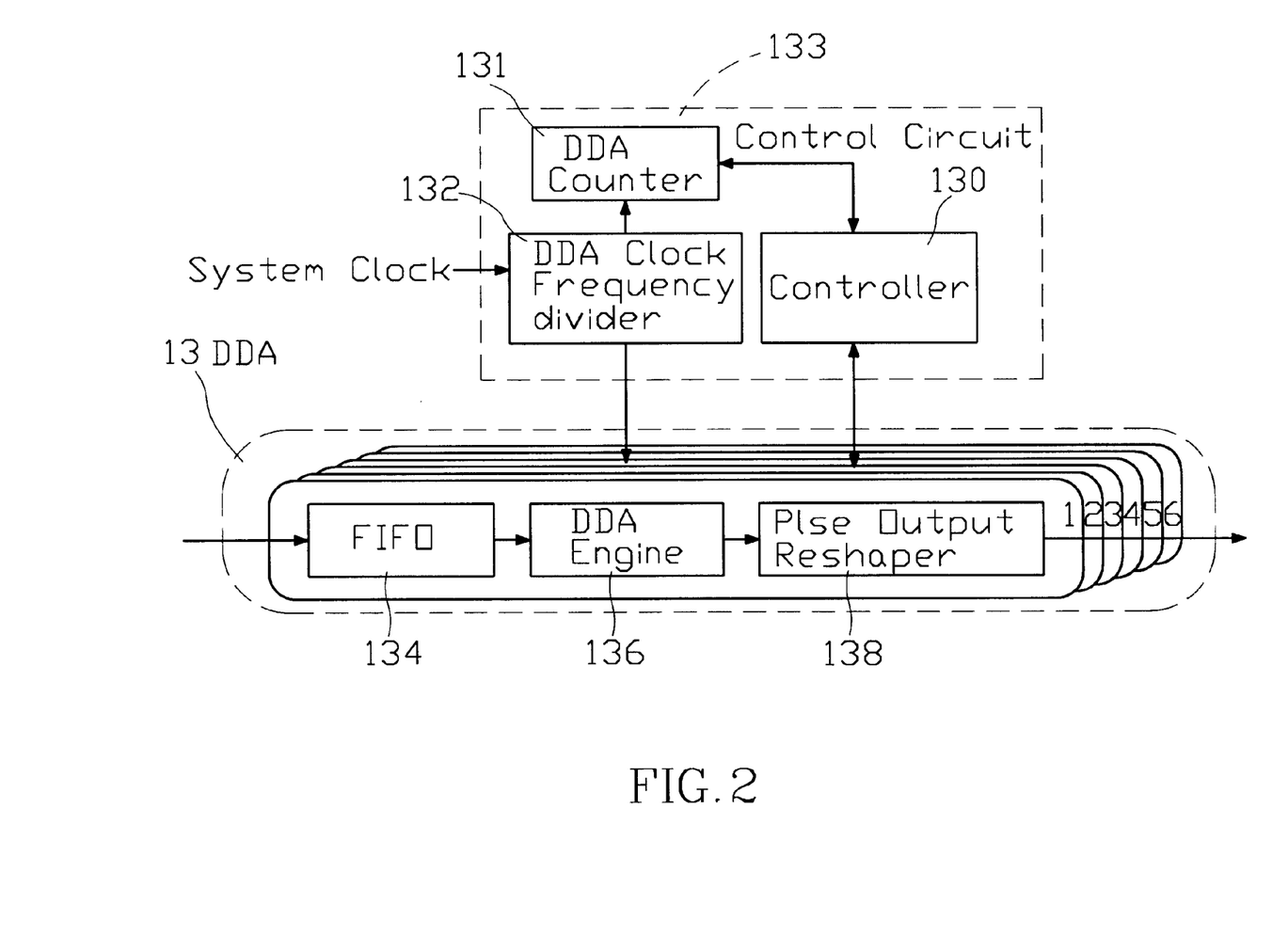
FIG. 2 is the block diagram of DDA

With reference now to FIG. 2, this figure depicts the block diagram of the DDA 13 and the connection thereof with control circuit 133. The control circuit 133 comprises a controller 130 which is in charge of the control procedure of the DDA 13. The controller 130 is connected to a DDA counter 131 for counting the operation times of the DDA 13. The DDA counter 13 is connected to a DDA clock frequency divider 132 to provide a divided timing clock to the DDA 13.

The DDA 13 shown in FIG. 2 comprises a 64×16 bit FIFO stacker 134 for storing 64 commands. The output of the FIFO 134 is connected to an DDA engine 136 which can convert the output command received from the DDA 13 into a uniform pulse train. When CPU writes a data (or command) to the FIFO 134, the DDA engine 136 converts the data or command to uniform pulse train, then outputs the pulse train to a pulse output reshaper 138 to reshape the waveform to be output. The output waveform can be different formats such as CW/CCW, PULSE/DIR A/B phase and inhibit.

As shown in FIG. 2, the present invention comprises 6 sets of DDA, each having an FIFO 134, an DDA engine 136 and a pulse output reshaper 138. The 6 set of DDA are controlled by the controller 130 in the control circuit 133, the DDA counter 131 and the DDA clock frequency divider 132, thus provides the circuit of the DDA 13 in the present invention.

Figure 3:
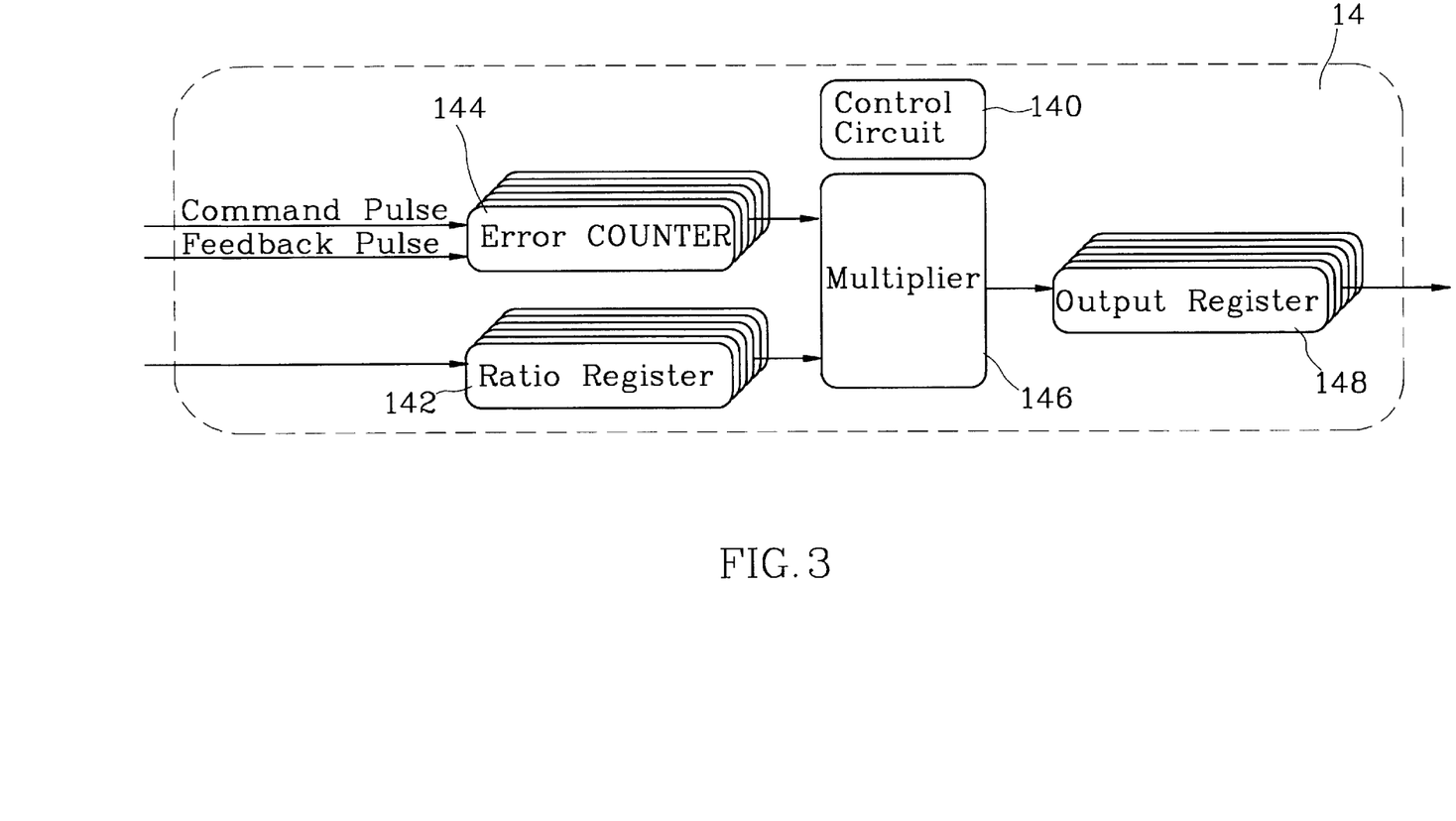
FIG. 3 is the block diagram of the positioning control loop

FIG. 3 shows the block diagram of the position control loop 14 which is used to provide closed loop control for the position of the servo motor. In the embodiment of the present invention, the 6 axis of the servo motor can be simultaneously controlled.

As shown in FIG. 3, the loop 14 comprises a control circuit 140 to control other components in loop 142, 6 ratio registers 14 to record the position loop gain of each axis to be controlled and functioning as one of input end of the loop 14, and 6 error counter 144 to count the error between the command pulse and the feedback pulse connected to the loop 14.

The output of the ratio register 142 and the error counter 144 are connected to a multiplier 146 to calculate the product of the error counter 144 and the ratio register 142. The output of the multiplier 146 is sent to an output register 148 for recording the error compensation for each axis of movement. The preferred embodiment has 6 sets of output register 148. Finally, the output results are processed by the DAC interface 15.

Figure 4:
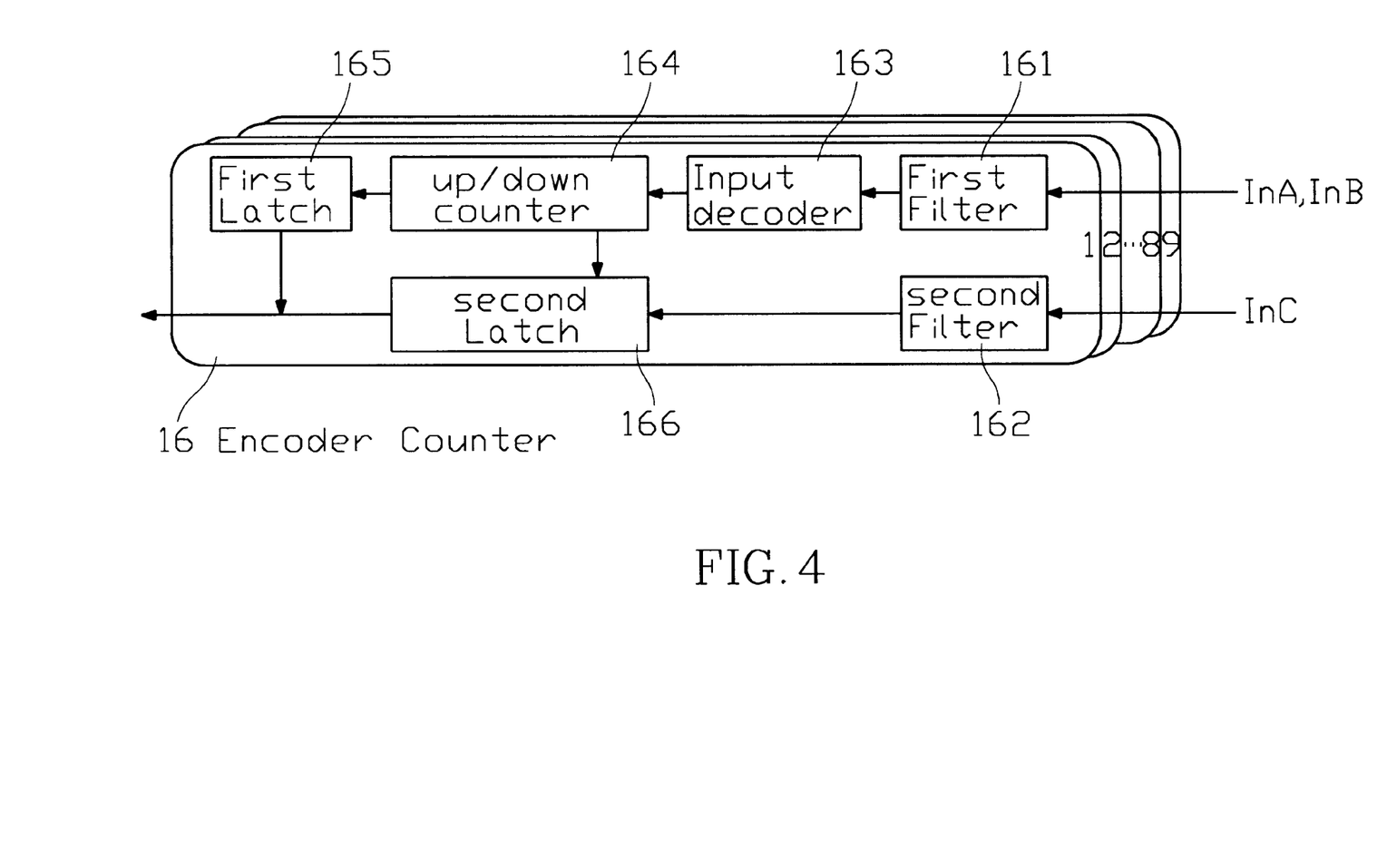
FIG. 4 is the block diagram of the counter in the encoder

FIG. 4 shows the block diagram of the encoder counter 16. The encoder counter 16 comprises a first filter 161 and a second filter 162 to process the encoder signals InA, InB and InC of motor and sends the signals InA and InB after filtering to a input decoder 163 for decoding. The input decoder 163 sends the decoding results x1, x2, x4, x0 of the input signals InA and InB to an up/down counter 164. Moreover, the sub-signal InC after filtering functions as the trigger signal of a second latch 166.

Moreover, the input decoder 163 is connected to the up/down counter 164 for signal counting. The counter 164 is connected to the second latch 166 to latch the counter 164 when the signal InC is generated. The first latch 165 performs latch operation when the CPU reads the value of read counter 164. The present invention uses 9 counters 16 for encoder to control 9 combination sets of encoders and handwheels.

Figure 5:
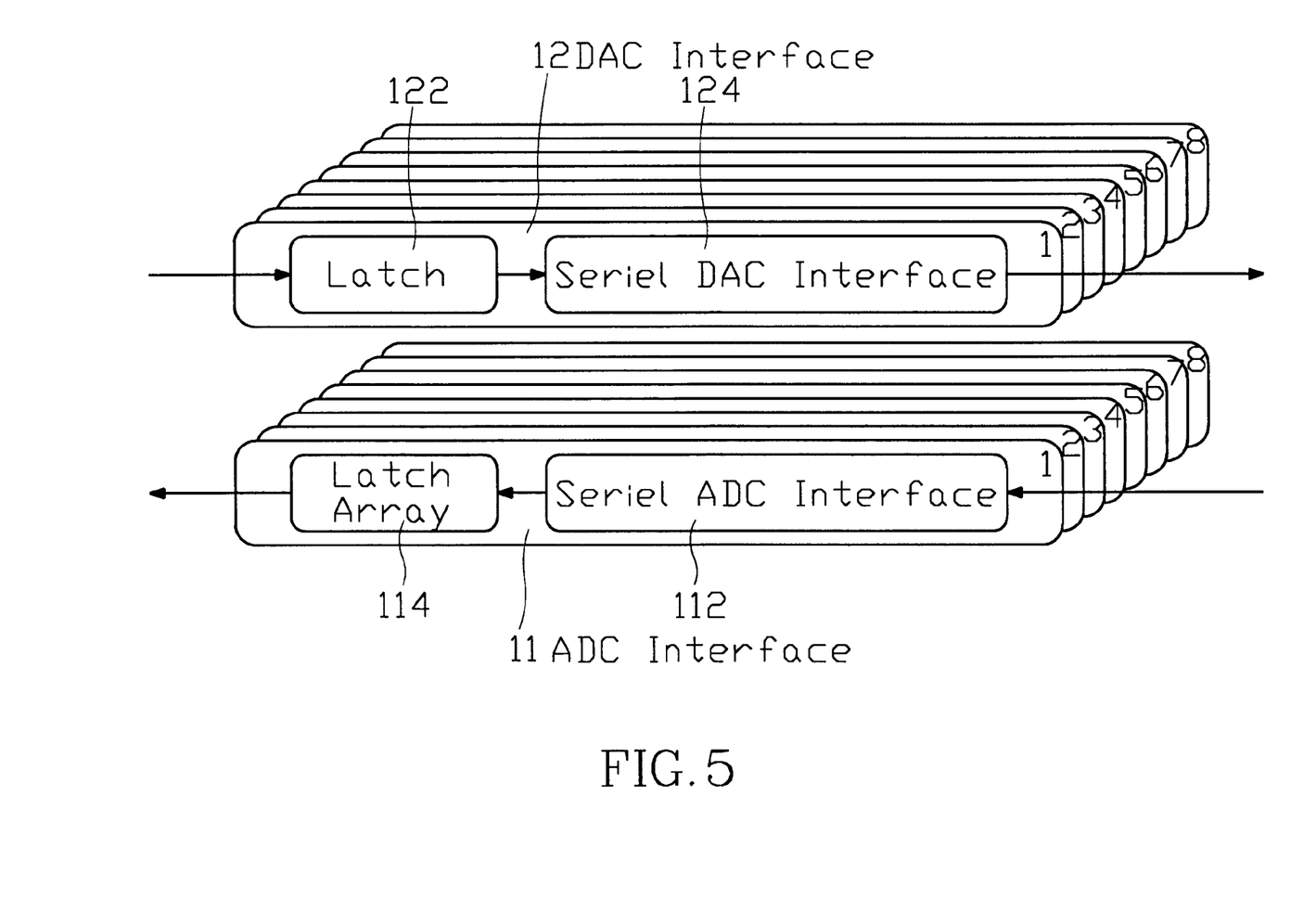
FIG. 5 is the block diagram of the D/A interface and A/D interface

FIG. 5 shows the block diagram of the DAC interface 12 and the ADC interface 11 of the IC 10. The DAC interface 12 comprises a latch 122 to latch the data to be D/A converted. The latch 122 is connected to a serial DAC interface 124 for interface data conversion. The embodiment of the present invention has two sets of DAC interface 12 and 15. The first set of DAC irterface 12 comprises two DAC interface circuits to control the speed and position of principle motor. The second set of the DAC interface 15 has 6 DAC interface to perform the closed loop positioning control of servo motors.

Moreover, the ADC interface 11 comprises a serial ADC interface 112 to perform interface conversion for external analog signals. The interface 112 is connected to a latch array 114 for latching the signal already being converted. The preferred embodiment has 8 ADC interfaces 11 which connects 8 set of analog sensors.

Figure 6:
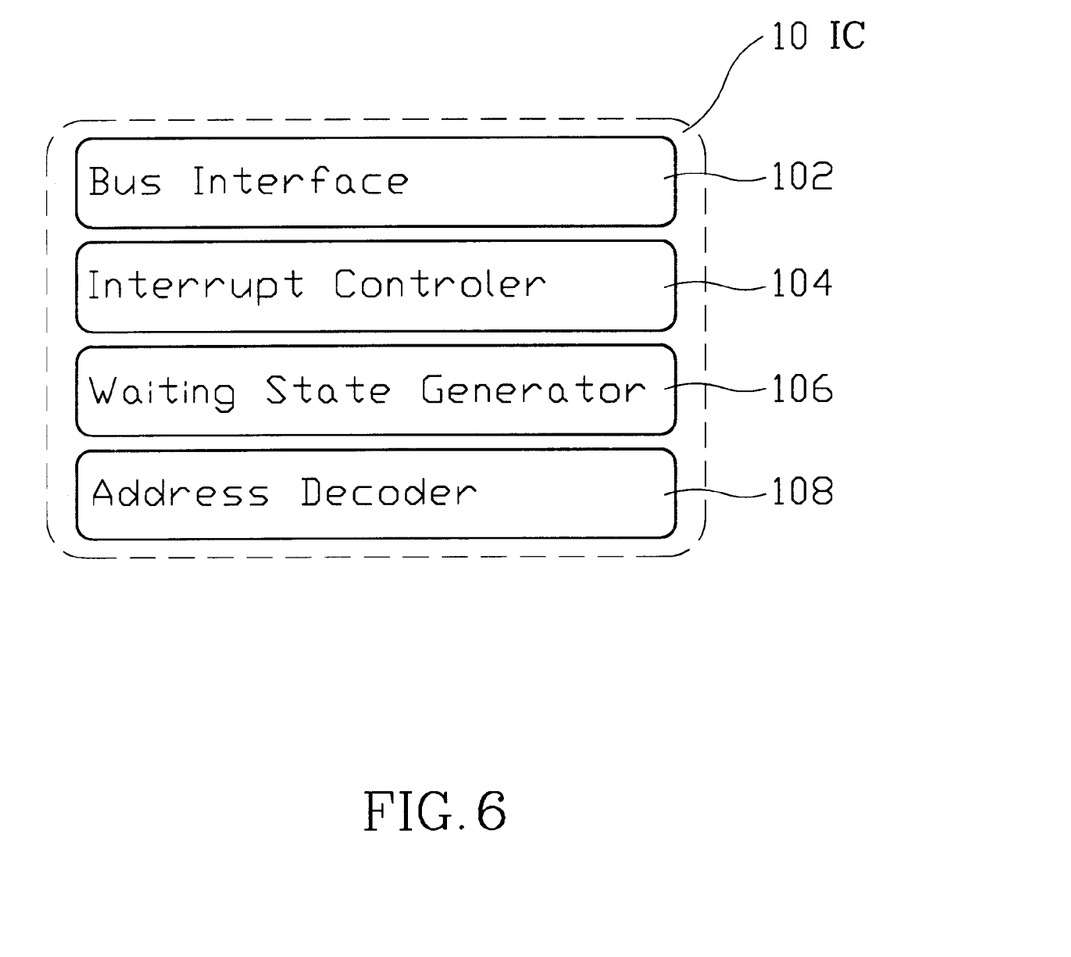
FIG. 6 is the block diagram of the multiple axis positioning control IC

FIG. 6 shows other circuit components of IC 10. As shown in this figure, The IC 10 comprises a bus interface 102 for the interface of data transfer with CPU, an interrupt controller 104 for controlling the interrupt vector of the CPU, a waiting state generator 106 for setting the waiting time of CPU when accessing the IC 10, and an address decoder 108 for dealing the address decoding process between the CPU and the IC 10.

FIG. 7 shows the connection of the present invention with external device. As shown in this figure, the IC 10 is connected to other computer through ISA bus 22 and can control multiple axis servo driver and motors 30. For open loop control, the IC 10 is output through DAC 32 and the motor position is feedback by encoder counter 16. The present invention is illustrated with 6 servo driver and motors 30. The IC 10 can be connected to a plurality of encoder or a plurality of hand wheels 34.

As shown in FIG. 7, the IC 10 can be connected to analog devices 26 and sensors 24 through A/D converter 25, thereby receiving analog signals and performing sensing operation for movement. Moreover, the IC 10 is connected to a principle axis 28 through an D/A converter 27 such that the running of the principle axis 28 can be controlled by the IC 10. Moreover, the principle axis 28 is one of output ends of the IC 1O.

To sum up, the integral-type IC for multiple-axis positioning control provides highly integrated and modular design for the position of automatic system by integrating those functions in one ASIC. Therefore, the remote control is simplified, the reliability is enhanced and the costs of production and maintenance.

Although the present invention has been described with reference to the preferred embodiment, it should understood that the applications of invention is not limited. Various substitutions and modifications have suggested in the foregoing description, and other will occur to those of ordinary skill in the art. Therefore, all such substitutions and modifications are intended to be embraced within the scope of the invention. as defined in the appended claims.

What is claimed is:

1. An IC for multiple-axis positioning control of a motor that includes an encoder, the IC comprising:
    a plurality of A/D interface circuits that receive analog input signals, and transform the analog input signals to corresponding digital signals;
    a plurality of positioning control loops (PCL);
    a plurality of D/A interface circuits that are coupled to outputs of the PCLs;
    a plurality of digital differential analyzers (DDA) that receive commands from an ISA bus, convert the commands to pulse waveform, and send the pulse waveform to the plurality of PCLs;
    a plurality of encoder counters that receive encoder signals from the encoder of the motor for recording the position of the motor, and which provide counting results to the PCLs;
    wherein the PCLs receive counting results from the encoder counters and receive the pulse waveform from the DDAs, and output a result to the D/A interface circuits; and
    wherein the DDAs are coupled to a control circuit that includes:
        a controller that controls the operation of the DDAs;
        a DDA counter that counts the operation times of the DDA; and
        a DDA clock frequency divider that provides a divided timing clock to the DDA.

2. The IC of claim 1, wherein the IC is coupled to an external circuit through an ISA bus for further coupling to an computer system.

3. The IC of claim 1, wherein the IC is coupled to an external circuit having a plurality of servo drivers and motors so that the IC can send position and speed commands to control the servo drivers and motors.

4. The IC of claim 1, wherein the IC is coupled to an external circuit having a sensor and analog input means for receiving the analog input signals.

5. The IC of claim 1, wherein the IC is coupled to an external circuit having a principal axis means for controlling the principal axis means.

6. An IC for multiple-axis positioning control of a motor that includes an encoder, the IC comprising:
    a plurality of A/D interface circuits that receive analog input signals, and transform the analog input signals to corresponding digital signals;
    a plurality of positioning control loops (PCL);

a plurality of D/A interface circuits that are coupled to outputs of the PCLs;

a plurality of digital differential analyzers (DDA) that receive commands from an ISA bus, convert the commands to pulse waveform, and send the pulse waveform to the plurality of PCLs, the DDAs comprising:
  a FIFO stacker provided in the DDA of one axis including a stacker with a plurality of bytes for storing the commands;
  a DDA engine which converts the commands to the pulse waveform; and
  a pulse output reshaper coupled to the DDA engine to reshape the pulse waveform; and a plurality of encoder counters that receive encoder signals from the encoder of the motor for recording the position of the motor, and which provide counting results to the PCLs;

wherein the PCLs receive counting results from the encoder counters and receive the pulse waveform from the DDAs, and output a result to the D/A interface circuits.

7. An IC for multiple-axis positioning control of a motor that includes an encoder, the IC comprising:
  a plurality of A/D interface circuits that receive analog input signals, and transform the analog input signals to corresponding digital signals;
  a plurality of positioning control Loops (PCL);
  a plurality of D/A interface circuits that are coupled to outputs of the PCLs;
  a plurality of digital differential analyzers (DDA) that receive commands from an ISA bus, convert the commands to pulse waveform, and send the pulse waveform to the plurality of PCLs; and
  a plurality of encoder counters that receive encoder signals from the encoder of the motor for recording the position of the motor, and which provide counting results to the PCLs, the encoder counters including:
    an input decoder;
    an up/down counter coupled to the input decoder;
    a plurality of filters coupled to the motor and the input decoder for filtering the encoder signals from the motor and providing the filtered encoder signals to the input decoder which then forwards the filtered encoder signals to the input decoder;
    a first latch coupled to the up/down counter to latch the up/down counter; and
    a second latch coupled to the up/down counter and one of the filters to latch the up/down counter;
  wherein the PCLs receive counting results from the encoder counters and receive the pulse waveform from the DDAs, and output a result to the D/A interface circuits.

8. An IC for multiple-axis positioning control of a motor that includes an encoder, the IC comprising:
  a plurality of A/D interface circuits that receive analog input signals, and transform the analog input signals to corresponding digital signals;
  a plurality of positioning control Loops (PCL);
  a plurality of D/A interface circuits that are coupled to outputs of the PCLs, the D/A interface circuits comprising:
    a latch circuit operating as an input; and
    a serial DAC interface circuit coupled to the latch circuit for performing interface data conversion and operating as an output;
  a plurality of digital differential analyzers (DDA) that receive commands from an ISA bus, convert the commands to pulse waveform, and send the pulse waveform to the plurality of PCLs; and
  a plurality of encoder counters that receive encoder signals from the encoder of the motor for recording the position of the motor, and which provide counting results to the PCLs;
  wherein the PCLs receive counting results from the encoder counters and receive the pulse waveform from the DDAs, and output a result to the D/A interface circuits.

9. The IC of claim 8, wherein the IC is coupled to an external circuit through an ISA bus for further coupling to a computer system.

10. The IC of claim 8, wherein the IC is coupled to an external circuit having a plurality of servo drivers and motors so that the IC can send position and speed commands to control the servo drivers and motors.

11. The IC of claim 8, wherein the IC is coupled to an external circuit having a sensor and analog input means for receiving the analog input signals.

12. The IC of claim 8, wherein the IC is coupled to an external circuit having a principal axis means for controlling the principal axis means.

13. An IC for multiple-axis positioning control of a motor that includes an encoder, the IC comprising:
  a plurality of A/D interface circuits that receive analog input signals, and transform the analog input signals to corresponding digital signals, the A/D interface circuits having:
    a serial ADC interface circuit operating as an input and receiving data from an external A/D converter for interfacing; and
    a latch circuit coupled to the serial ADC interface circuit and operating as an output to latch converted data;
  a plurality of positioning control loops (PCL);
  a plurality of D/A interface circuits that are coupled to outputs of the PCLs;
  a plurality of digital differential analyzers (DDA) that receive commands from an ISA bus, convert the commands to pulse waveform, and send the pulse waveform to the plurality of PCLs; and
  a plurality of encoder counters that receive encoder signals from the encoder of the motor for recording the position of the motor, and which provide counting results to the PCLs;
  wherein the PCLs receive counting results from the encoder counters and receive the pulse waveform from the DDAs, and output a result to the D/A interface circuits.

14. The IC of claim 13, wherein the IC is coupled to an external circuit through an ISA bus for further coupling to a computer system.

15. The IC of claim 13, wherein the IC is coupled to an external circuit having a plurality of servo drivers and motors so that the IC can send position and speed commands to control the servo drivers and motors.

16. The IC of claim 13, wherein the IC is coupled to an external circuit having a sensor and analog input means for receiving the analog input signals.

17. The IC of claim 13, wherein the IC is coupled to an external circuit having a principal axis means for controlling the principal axis means.

18. An IC for multiple-axis positioning control of a motor that includes an encoder, the IC comprising:
- a plurality of A/D interface circuits that receive analog input signals, and transform the analog input signals to corresponding digital signals;
- a plurality of positioning control loops (PCL);
- a plurality of D/A interface circuits that are coupled to outputs of the PCLs;
- a plurality of digital differential analyzers (DDA) that receive commands from an ISA bus, convert the commands to pulse waveform, and send the pulse waveform to the plurality of PCLs;
- a plurality of encoder counters that receive encoder signals from the encoder of the motor for recording the position of the motor, and which provide counting results to the PCLs;
- wherein the PCLs receive counting results from the encoder counters and receive the pulse waveform from the DDAs, and output a result to the D/A interface circuits, and wherein the PCLs include:
  - a control circuit;
  - a plurality of ratio registers to record the position loop gain of each axis to be controlled and functioning as an input end of the PCLS;
  - a plurality of error counters to calculate the error between the command pulse waveform and a feedback pulse coupled to the PCL;
  - a multiplier coupled to the ratio registers and the error counters to calculate the product of the ratio registers and the error counters; and
  - a plurality of output registers coupled to the multiplier to record the error compensation value of the control axis in each direction.

19. The IC of claim 18, wherein the IC is coupled to an external circuit through an ISA bus for further coupling to a computer system.

20. The IC of claim 18, wherein the IC is coupled to an external circuit having a sensor and analog input means for receiving the analog input signals.

* * * * *